United States Patent Office 2,799,245
Patented July 16, 1957

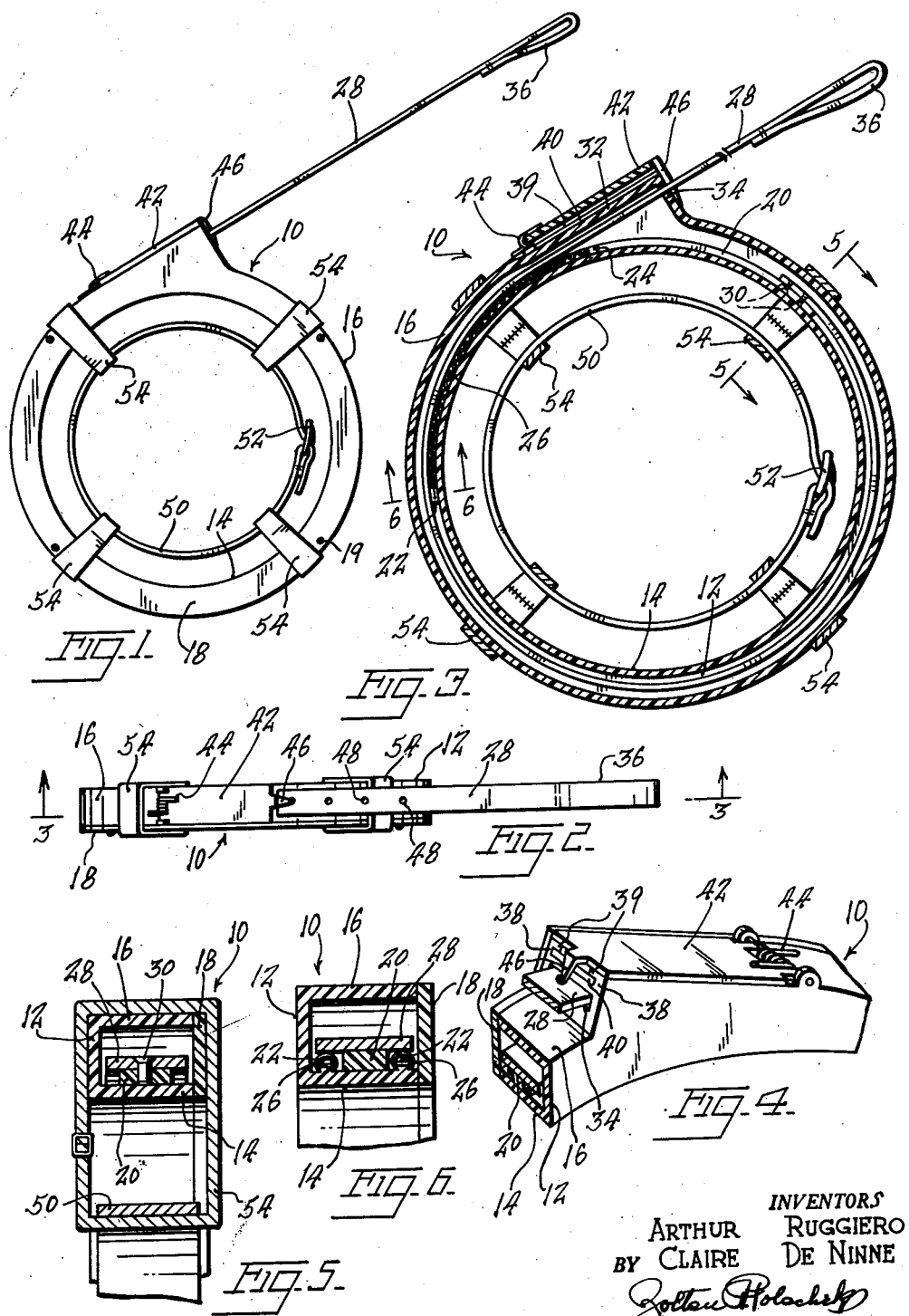

2,799,245

COMBINATION RECOILABLE DOG LEASH AND COLLAR

Arthur Ruggiero and Claire De Ninne, New Rochelle, N. Y.

Application December 15, 1954, Serial No. 475,459

7 Claims. (Cl. 119—106)

This invention relates to leashes and, more particularly, has reference to a combination leash and collar, so designed as to cause the leash to be normally under spring bias tending to coil the same within the collar.

An important object of the present invention is to provide a combination leash and collar as described which will be particularly adapted for manufacture at relatively low cost, from such materials as molded plastic or the like.

Another object of importance is to provide an improved means within the body of the collar adapted to cause coiling of the length of the leash within said collar body, with said means being adapted to permit unwinding to a selected extent for adjustment of the length of the exposed portion of the leash.

Still another object is to include, in association with the leash and collar, a combination identification card or licence tag holder and detent, adapted to hold a card or tag against accidental loss while at the same time being adapted to engage the leash in selected positions to which it is adjustably extended out of the collar body.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a combination dog leash and collar formed in accordance with the present invention.

Fig. 2 is a top plan view.

Fig. 3 is an enlarged sectional view substantially on line 3—3 of Fig. 2.

Fig. 4 is an enlarged, fragmentary perspective view showing the identification card holder and detent.

Fig. 5 is a cross-sectional view, on an enlarged scale, through the collar substantially on line 5—5 of Fig. 3.

Fig. 6 is an enlarged sectional view on line 6—6 of Fig. 3, showing the spring means and rotatable ring used to normally bias the leash to a retracted, coiled position.

The reference numeral 10 has been applied generally in the several figures of the drawing to an annular collar body, formed in two pieces of molded plastic or the like. The main piece or section of the body 10 is formed to include a side wall 12, an inner wall 14, and an outer wall 16. Thus, the main section is of C-shaped cross section. The other side wall of the body constitutes the second section or piece thereof, and is formed as a removable side wall 18 connectable by small screws 19 or the like to the main section, said screws extending into threaded openings spaced equal distances apart circumferentially of the outer wall and opening upon the edge of said outer wall remote from the side wall 12.

The two sections, when connected in the manner referred to, cooperate to provide a hollow, annular collar which, when viewed in cross section at any location upon its circumference, is of rectangular cross-sectional shape.

Rotatable upon the inner wall 14, within the annular body 10, is a leash-support ring 20. This is substantially narrower in width than the width of the body, so as to define circumferentially extending spaces at each side of said ring. Transversely aligned lugs are formed in the body, upon the inner wall 14, and a pair of transversely aligned lugs 22, 24 are formed upon the ring. Springs 26 are connected between the lugs 22, 24 of the collar body and ring respectively, and are capable of being expanded resiliently to a length substantially greater than the normal, contracted lengths of the springs. This will permit the ring to rotate through a full cycle within the annular body 10, thereby to extend the leash to a substantial degree. A flexible leash member has been designated at 28, and can be formed of a thin but strong, flat length of leather, plastic or the like. The width of the leash member 28 is substantially equal to the inside width of the annular body 10. At its inner end, the leash member 28 is riveted as at 30 or otherwise fixedly connected to the ring. Intermediate its ends, the leash passes out of the body, through the provision of an approximately triangular enlargement 32 formed upon the outer wall 16 of said body, having a transversely extending slot 34 through which the leash member extends. The outer end of the leash member is provided with a loop to form a handle 36, or can be provided with any other type of handle found suitable.

The enlargement 32 has a sloping wall approximately tangential to the outer circumference of the annular body 10. Said sloping wall is relatively elongated, and along opposite sides has flanges 38 formed with inwardly turned longitudinal lips 39. An identification card 40, which may bear the name of the dog, the name and address of the owner, and the owner's telephone number, can be removably positioned within the holder defined by the surface of the sloped wall of enlargement 32 and the lipped flanges 38 of the enlargement. Alternatively, a dog licence tag can be positioned in said holder.

In any event, a cover 42 of transparent plastic overlies the identification card or license tag, to provide a window through which said tag or card may be viewed. The cover 42 at one end is connected by spring hinge 44 to the sloped wall of the enlargement 32, at the inner end of said sloped wall, the spring hinge being under tension effective to normally bias the cover into a position in which it is in engagement along its sides with the lips 39, thereby to prevent loss of the tag or card.

At its free end, the cover 42 is integrally formed with a relatively long, depending prong 46, and formed in the leash member 28 at uniformly spaced locations along the length thereof are prong-receiving openings 48.

It will be seen that the tension of the spring hinge connection 44 is such as to normally urge the cover 42 to a position in which it confines the identification card or license tag, and at the same time, is disposed with its prong 46 extended through a selected opening 48. This holds the leash member extended to a selected extent, and the leash member will not be coiled in the body 10 of the collar unless and until the cover 42 of the identification card holder is lifted to an extent sufficient to disengage the prong 46 from the opening in which it was previously disposed. As soon as the prong is removed from said opening, the springs 26, tending to contract, will automatically coil the leash within the collar body 10.

Due to the arrangement illustrated, the leash member can be extended out of the collar body only to a short extent if desired, so as to cause the dog to be walked on short leash. Or, if the dog is to be given more freedom, the leash can be extended out of the collar body to a greater extent. In either position, or in any intermediate position, the cover 42, when released, is spring biased to a position in which the prong 46 will engage in one of the openings 48 to hold the leash in the selected position of adjustment.

In view of the rigid formation of the body 10, it is necessary that it be formed to a diameter sufficient to permit the same to be passed over the dog's head. Accordingly, if it is desired to cause the collar to be securely held without possibility of the dog's removing the same with his paws, there can be provided a flexible inner collar element 50 of leather or the like, that is adapted to engage with sufficient snugness about the neck of the dog, said element 50 having the usual buckle 52 permitting adjustment of the diameter of the element 50 to the size of the neck of the dog. Loops 54 are spaced circumferentially of the element 50, and extend radially outwardly therefrom about the body 10, to hold the same in proper position. At the same time, the body 10 is not uncomfortable to the dog, since should the dog lie down, for instance, the loops 54, being passed loosely about the body 10, will permit said body to shift to various positions in which it is eccentrically disposed relative to the diameter of the collar element 50, where it will not be uncomfortable so far as the dog is concerned.

It is to be noted that the cover prong 46 not only engages in a selected opening of the leash member, but also when so engaged cooperates with the leash member in preventing the confined identification card or dog tag from shifting out of the cavity provided therefor by the flanges, at the end of the holder where the prong is located.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by United States Letters Patent is:

1. A combination dog leash and collar comprising a collar body, a leash coiled therein, means tending to normally retract the leash into the body, the body including an enlargement having a slot through which the leash extends, and means on said enlargement adapted to hold the leash in selected positions to which it is extended out of the slot, said collar further including a flexible inner collar element formed to a substantially smaller diameter than said collar body, said inner element including flexible means radiating outwardly therefrom and extending about the collar body to hold said collar body and element in connected relation, said element being adapted to be connected adjustably about the neck of a dog.

2. A combination dog leash and collar comprising a collar body, a leash coiled therein, means tending to normally retract the leash into the body, the body including an enlargement having a slot through which the leash extends, and means on said enlargement adapted to hold the leash in selected positions to which it is extended out of the slot, said collar further including a flexible inner collar element formed to a substantially smaller diameter than said collar body, said inner element including means radiating outwardly therefrom and extending about the collar body to hold said collar body and element in connected relation, said element being adapted to be connected adjustably about the neck of a dog, said means radiating from the collar element comprising a series of flexible loops spaced approximately equal distances apart circumferentially of said element and collar body, said loops embracing the collar body loosely, whereby to permit the collar body to be shifted to positions eccentric to said element.

3. A combination dog leash and collar comprising a collar body, a leash coiled therein, means tending to normally retract the leash into the body, the body including an enlargement having a slot through which the leash extends, and means on said enlargement adapted to hold the leash in selected positions to which it is extended out of the slot, the enlargement being formed to an approximately triangular shape so as to include a sloping wall and a wall extending approximately radially of the collar body, said sloping wall being extended approximately tangentially of said body, the slot being formed in the second-named wall of the enlargement, the sloping wall being formed at opposite sides thereof with spaced guide flanges, whereby to provide means for holding an identification card or dog tag in the space between said flanges.

4. A combination dog leash and collar comprising a collar body, a leash coiled therein, means tending to normally retract the leash into the body, the body including an enlargement having a slot through which the leash extends, and means on said enlargement adapted to hold the leash in selected positions to which it is extended out of the slot, the enlargement being formed to an approximately triangular shape so as to include a sloping wall and a wall extending approximately radially of the collar body, said sloping wall being extended approximately tangentially of said body, the slot being formed in the second-named wall of the enlargement, the sloping wall being formed at opposite sides thereof with spaced guide flanges, whereby to provide means for holding an identification card or dog tag in the space between said flanges, said flanges being formed with inwardly turned lips to confine said card or tag between the same.

5. A combination dog leash and collar comprising a collar body, a leash coiled therein, means tending to normally retract the leash into the body, the body including an enlargement having a slot through which the leash extends, and means on said enlargement adapted to hold the leash in selected positions to which it is extended out of the slot, the enlargement being formed to an approximately triangular shape so as to include a sloping wall and a wall extending approximately radially of the collar body, said sloping wall being extended approximately tangentially of said body, the slot being formed in the second-named wall of the enlargement, the sloping wall being formed at opposite sides thereof with spaced guide flanges, whereby to provide means for holding an identification card or dog tag in the space between said flanges, said flanges being formed with inwardly turned lips to confine said card or tag between the same, said last-named means comprising a transparent cover spring hinged at one end to the enlargement and overlying the space between said flanges, so as to provide a window through which the card or tag may be viewed, said cover including means at one end thereof engageable with the leash in the closed position to which the cover is spring biased, for holding the leash against longitudinal movement.

6. A combination dog leash and collar comprising a collar body, a leash coiled therein, means tending to normally retract the leash into the body, the body including an enlargement having a slot through which the leash extends, and means on said enlargement adapted to hold the leash in selected positions to which it is extended out of the slot, the enlargement being formed to an approximately triangular shape so as to include a sloping wall and a wall extending approximately radially of the collar body, said sloping wall being extended approximately tangentially of said body, the slot being formed in the second-named wall of the enlargement, the sloping wall being formed at opposite sides thereof with spaced guide flanges, whereby to provide means for holding an identification card or dog tag in the space between said flanges, said flanges being formed with inwardly turned lips to confine said card or tag between the same, said last-named means comprising a transparent cover spring hinged at one end to the enlargement and overlying the space between said flanges, so as to provide a window through which the card or tag may be viewed, said cover including means at one end thereof engageable with the leash in the closed position to which the cover is spring biased, said means on the cover comprising a prong at the free end thereof, the leash having a longitudinal series of openings any of which is adapted to receive said prongs to hold the leash in selected positions to which the same is extended.

7. A combination dog leash and collar comprising a collar body, a leash coiled therein, means tending to normally retract the leash into the body, the body including an enlargement having a slot through which the leash extends, and means on said enlargement adapted to hold the leash in selected positions to which it is extended out of the slot, the enlargement being formed to an approximately triangular shape so as to include a sloping wall and a wall extending approximately radially of the collar body, said sloping wall being extended approximately tangentially of said body, the slot being formed in the second-named wall of the enlargement, the sloping wall being formed at opposite sides thereof with spaced guide flanges, whereby to provide means for holding an identification card or dog tag in the space between said flanges, said flanges being formed with inwardly turned lips to confine said card or tag between the same, said last-named means comprising a transparent cover spring hinged at one end to the enlargement and overlying said flanges, so as to provide a window through which the card or tag may be viewed, said cover including means at one end thereof engageable with the leash in the closed position to which the cover is spring biased, said means on the cover comprising a prong at the free end thereof, the leash having a longitudinal series of openings any of which is adapted to receive said prongs to hold the leash in selected positions to which the same is extended, said prong extending across the card-holding space to close the same at one end, thereby to confine the card or tag within said holding space whenever the prong is engaged in an opening of the leash.

References Cited in the file of this patent

UNITED STATES PATENTS

| | | |
|---|---|---|
| 441,706 | Schneider | Dec. 2, 1890 |
| 2,222,409 | Gottlieb | Nov. 19, 1940 |
| 2,314,504 | Lifchultz | Mar. 23, 1943 |
| 2,496,748 | Pond | Feb. 7, 1950 |
| 2,658,234 | Trammell et al. | Nov. 10, 1953 |